United States Patent [19]

Shinzawa et al.

[11] Patent Number: 4,567,725
[45] Date of Patent: Feb. 4, 1986

[54] TRAP REGENERATIVE DEVICE CONTROL APPARATUS

[75] Inventors: Motohiro Shinzawa, Yokosuka; Yoji Hasegawa, Yokohama, both of Japan

[73] Assignee: Nissan Motor Company, Limited, Yokohama, Japan

[21] Appl. No.: 569,483

[22] Filed: Jan. 9, 1984

[30] Foreign Application Priority Data

Jan. 10, 1983 [JP] Japan .................................. 58-1129
Jan. 24, 1983 [JP] Japan .................................. 58-8659

[51] Int. Cl.⁴ .............................................. F01N 3/02
[52] U.S. Cl. ...................................... 60/274; 60/286; 60/303; 60/311
[58] Field of Search ................. 60/274, 286, 303, 311

[56] References Cited

U.S. PATENT DOCUMENTS

| 4,211,075 | 7/1980 | Ludecke | 60/311 |
| 4,404,795 | 9/1983 | Oishi | 60/303 |
| 4,424,671 | 1/1984 | Tokura | 60/274 |
| 4,450,682 | 5/1984 | Sato | 60/303 |
| 4,462,208 | 7/1984 | Hicks | 60/286 |

FOREIGN PATENT DOCUMENTS

| 56115809 | 1/1979 | Japan . |
| 57637 | 4/1980 | Japan . |
| 12029 | 9/1981 | Japan . |

Primary Examiner—Douglas Hart
Attorney, Agent, or Firm—Lowe, King, Price & Becker

[57] ABSTRACT

An apparatus controls the operation of a regenerative device for generating a quantity of heat to burn the exhaust particles collected in a trap located in the exhaust conduit of an internal combustion engine. The apparatus is responsive to the pressures on the inlet and outlet sides of the trap to detect a regeneration requirement to operate the regenerative device so as to regenerate the trap. The apparatus is also responsive to the engine speed and engine load to control the quantity of heat the regenerative device generates so as to maintain the inlet side of the trap at a target temperature during the regeneration period.

22 Claims, 19 Drawing Figures

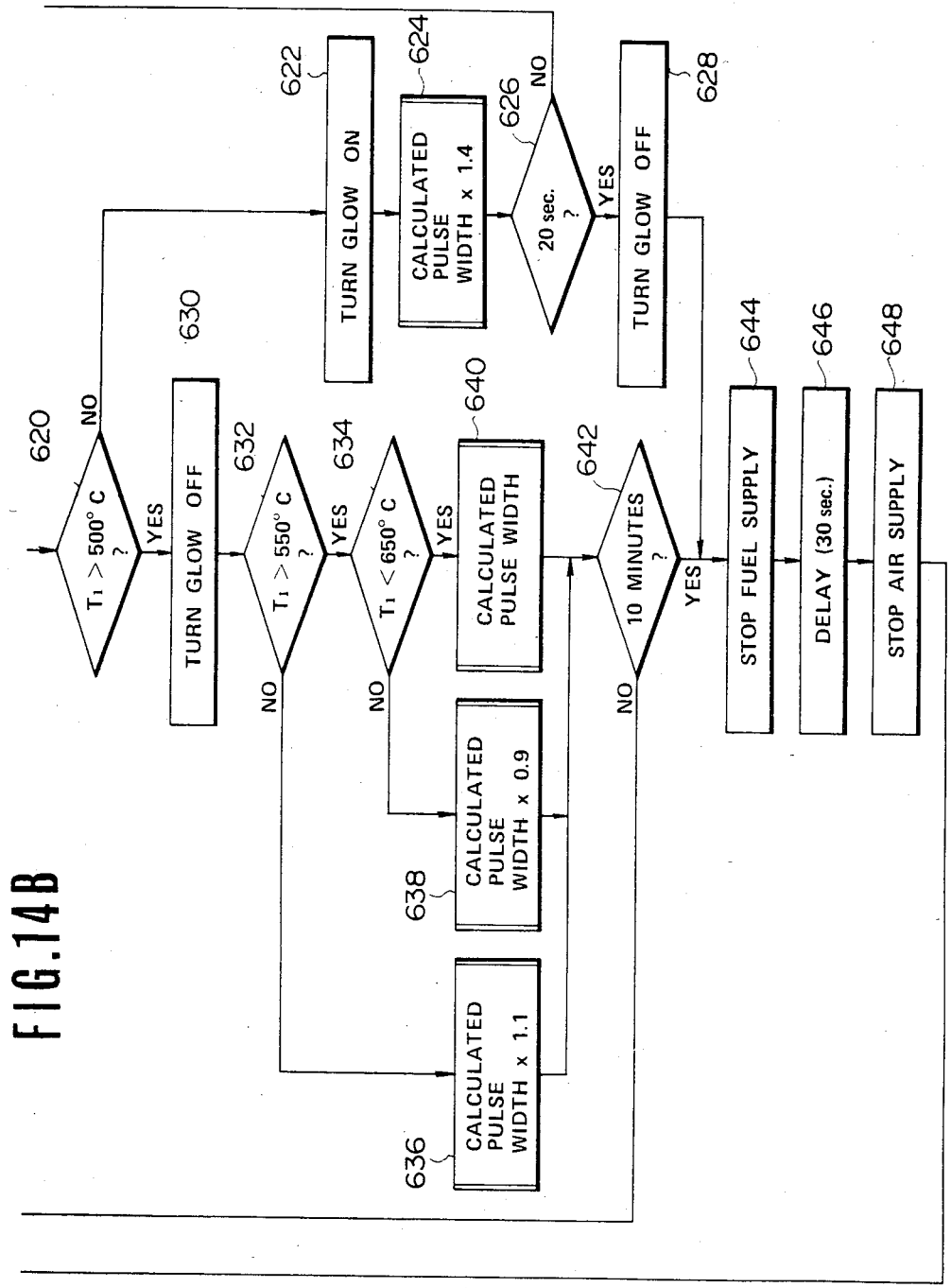

TRAP REGENERATIVE DEVICE CONTROL APPARATUS

BACKGROUND OF THE INVENTION

This invention relates to an apparatus for controlling the operation of a regenerative device to generate a quantity of heat so as to burn the exhaust particles collected in a trap located in the exhaust conduit of an internal combustion engine.

It has been proposed to purify exhaust gases from an automobile internal combustion engine by employing a trap located in the exhaust conduit of the engine to collect therein carbon or other particles of the exhaust gases. A regenerative burner is repetitively operated with having a constant supply of fuel to burn the particles collected in the trap so as to regenerate the trap each time a regeneration occurs. The regeneration requirement is determined by the pressure differential across the trap reaching a predetermined value or the pressure on the inlet side of the trap reaching a value determined in accordance with engine operating parameters.

With such a conventional trap regenerative burner control apparatus having no control of flow rate of fuel to the regenerative burner, however, it is impossible to maintain the inlet side of the trap at a temperature optimum to regenerate the trap in the most efficient manner as will be described in detail.

Therefore, the present invention provides a trap regenerative device control apparatus which can maintain the inlet of the trap at a desired temperature during trap regeneration.

SUMMARY OF THE INVENTION

There is provided, in accordance with the present invention, an apparatus for use in an internal combustion engine having an exhaust conduit for discharging exhaust particles together with exhaust gases to the atmosphere and a trap located in the exhaust conduit for collecting exhaust particles. The apparatus comprises regenerative means operable to generate a quantity of heat to burn the exhaust particles collected in the trap so as to regenerate the trap. Sources are provided for deriving signals indicative of (a) the pressure (P1) on the inlet side of the trap, (b) the pressure (P2) on the outlet side of the trap, (c) engine speed, and (d) engine load. The signals indicative of (a), (b), (c) and (d) are applied to control means which detects a regeneration requirement to operate the regenerative means for a predetermined period. The control means includes means responsive to the signals indicative of (c) and (d) for controlling the quantity of heat the regenerative means generates to maintain the inlet side of the trap at a target temperature during the regeneration period.

BRIEF DESCRIPTION OF THE DRAWINGS

Embodiments of the apparatus of the invention, and methods of operation thereof will now be described by reference to the following specification taken in connection with the accompanying drawings.

For a better understanding of the invention, frequent reference will be made to the drawings wherein:

FIGS. 14A and 14B are a sequence of flow diagram illustrative of the operation of the digital computer used in the control unit of FIG. 12;

DESCRIPTION OF THE PREFERRED EMBODIMENTS

Before describing the specific structural details of the trap regenerative burner control apparatus of the present invention, a prior art control apparatus will be briefly described thereinafter in order to specifically point out the difficulties attendant thereon.

A conventional trap regenerative burner control apparatus are designed to operates a regenerative burner repetitively with a constant supply of fuel to burn the exhaust particles collected in the trap so as to regenerate the trap each time a regeneration requirement occurs. In order to burn the exhaust particles collected in the trap with high efficiency, it is required to maintain the inlet side of the trap at about 600° C. or more. The temperature on the inlet side of the trap is dependent upon parameters such as the flow rate of fuel to the regenerative burner, the flow rate of exhaust gases to the trap, and the temperature of exhaust gases to the trap.

Figure 1:
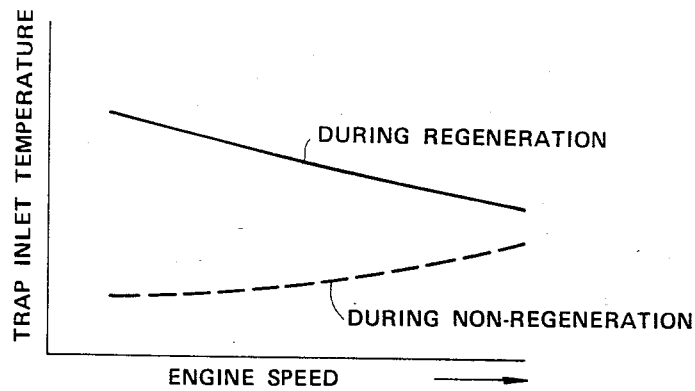
FIG. 1 is a graph of trap inlet temperature versus engine speed.
Figure 2:
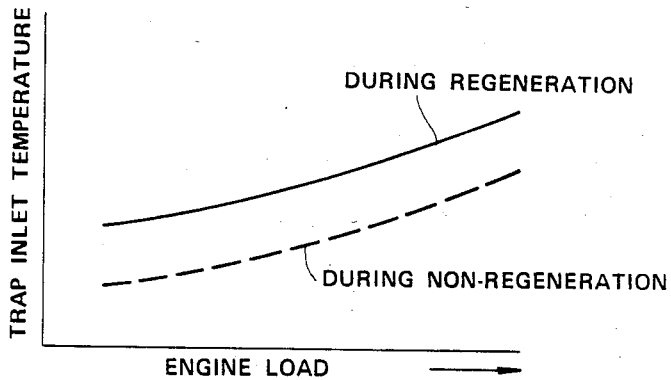
FIG. 2 is a graph of trap inlet temperature versus engine load.

Assuming that the flow rate of fuel to the regenerative burner is constant, the flow rate of exhaust gases to the trap increases to decrease the temperature on the inlet side of the trap as the engine speed increases even at a constant engine load, as shown in FIG. 1, whereas the temperature of exhaust gases to the trap increases to increase the temperature on the inlet side of the trap as the engine load increases even at a constant engine speed, as shown in FIG. 2. In other words, the temperature on the inlet side of the trap is inversely proportional to engine speed and is directly proportional to engine load.

To assure that the inlet side of the trap can be maintained at about 600° C. or more over the engine operating conditions, it is therefore required to set the flow rate of fuel to the regenerative burner at a great value sufficient to maintain the inlet side of the trap at about 600° C. even under high speed and low load conditions. As a result, the regenerative burner has an extra supply of fuel and heats the trap to an excessively high temperature causing trrap burn-out and sometimes fire in the trap under low speed and high load conditions. In addition, such control causes waste of fuel.

Figure 3:
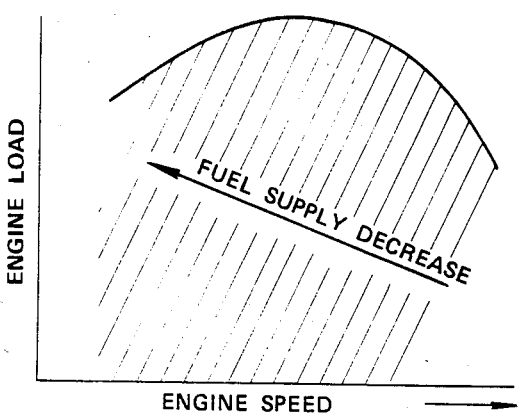
FIG. 3 is a graph showing the control of the amount of fuel to the burner as functions of engine load and engine speed.

The present invention eliminates these difficulties attendant upon such a conventional trap regenerative burner control apparatus of the type providing a constant supply of fuel to the regenerative burner by controlling the amount of fuel to the regenerative burner in accordance with engine speed and engine load, as shown in FIG. 3, to maintain the inlet side of the trap at a temperature optimum to regenerate the trap over the whole range of engine operating conditions.

Figure 4:
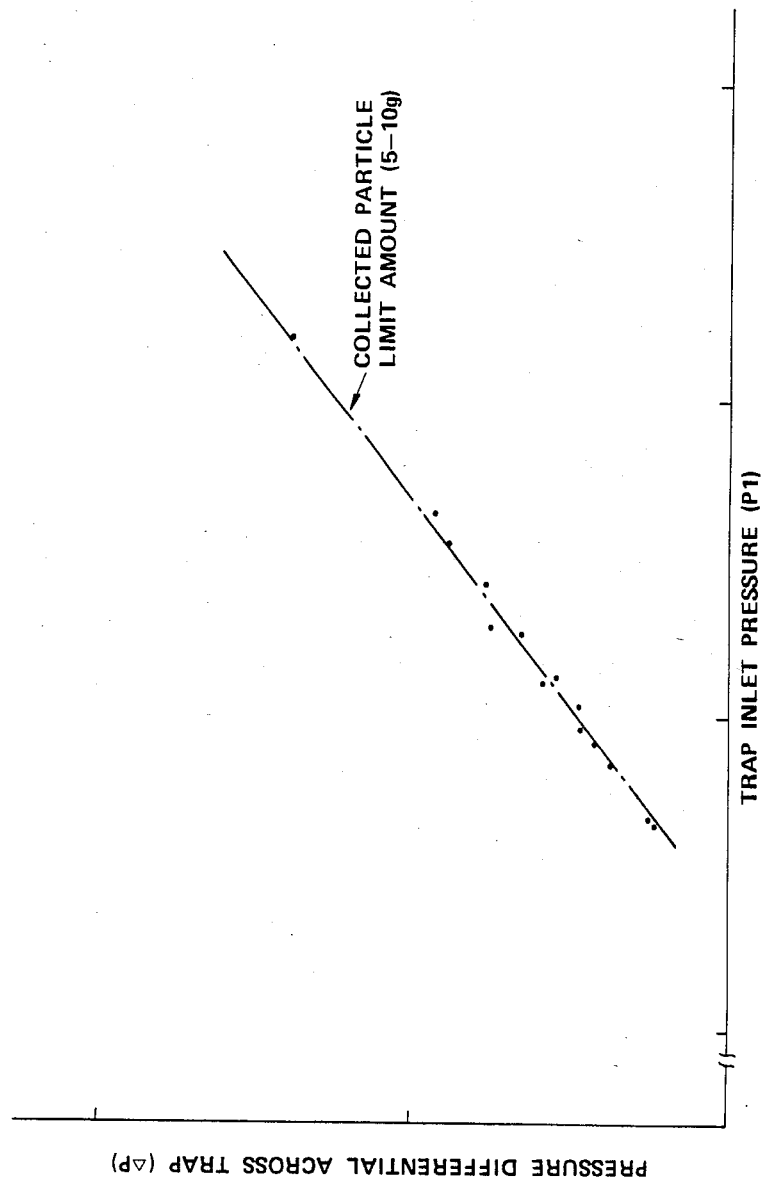
FIG. 4 is a graph plotting the pressure differential across a trap with respect to given pressures on the inlet side of the trap.

Referring to FIG. 4, the principle of determination of a regeneration requirement will be described to provide a basis for a better understanding of the function of the trap regenerative burner control apparatus.

A honeycomb trap is similar to a laminar flow meter in that for the same amount of the particles collected in the trap, a linear relationship exists between the pressure on the inlet side of the trap and the pressure differential across the trap. In FIG. 4, we have plotted the pressure differential ($\Delta P = P1 - P2$) existing across the trap against the pressure (P1) created on the inlet side of the trap under a condition where the amount of the particles collected in the trap reaches a limit, for example, 5 g to 10 g, at which limit the burner is required to operate to regenerate the trap. The results show that the pressure differential ($\Delta P max$) existing across the trap when the amount of the particles collected in the trap reaches the limit is maintained in a linear relationship with respect to the pressure (P1) on the inlet side of the trap, the linear relationship being expressed by the equation as follows:

$$\Delta Pmax = A \cdot P1 - B \quad (1)$$

wherein A and B are constants.

Therefore, it can be seen that the regeneration requirement can be determined by comparing the pressure differential ($\Delta P$) across the trap with the threshold pressure differential value ($\Delta Pmax$) given by equation (1). In this case, the control apparatus operates the burner to regenerate the trap when the pressure differential ($\Delta P$) across the trap exceeds the threshold pressure differential value ($\Delta Pmax$). The regeneration requirement may be determined by comparing the ratio ($\Delta P/P1$) of the pressure differential ($\Delta P$) to the pressure (P1) on the inlet side of the trap or the ratio (P2/P1) of the pressure (P2) on the outlet side of the trap to the pressure (P1) on the inlet side of the trap with a predetermined value. In this case, the control apparatus operates the burner to regenerate the trap when the ratio ($\Delta P/P1$) or (P2/P1) exceeds the predetermined value.

Figure 5:
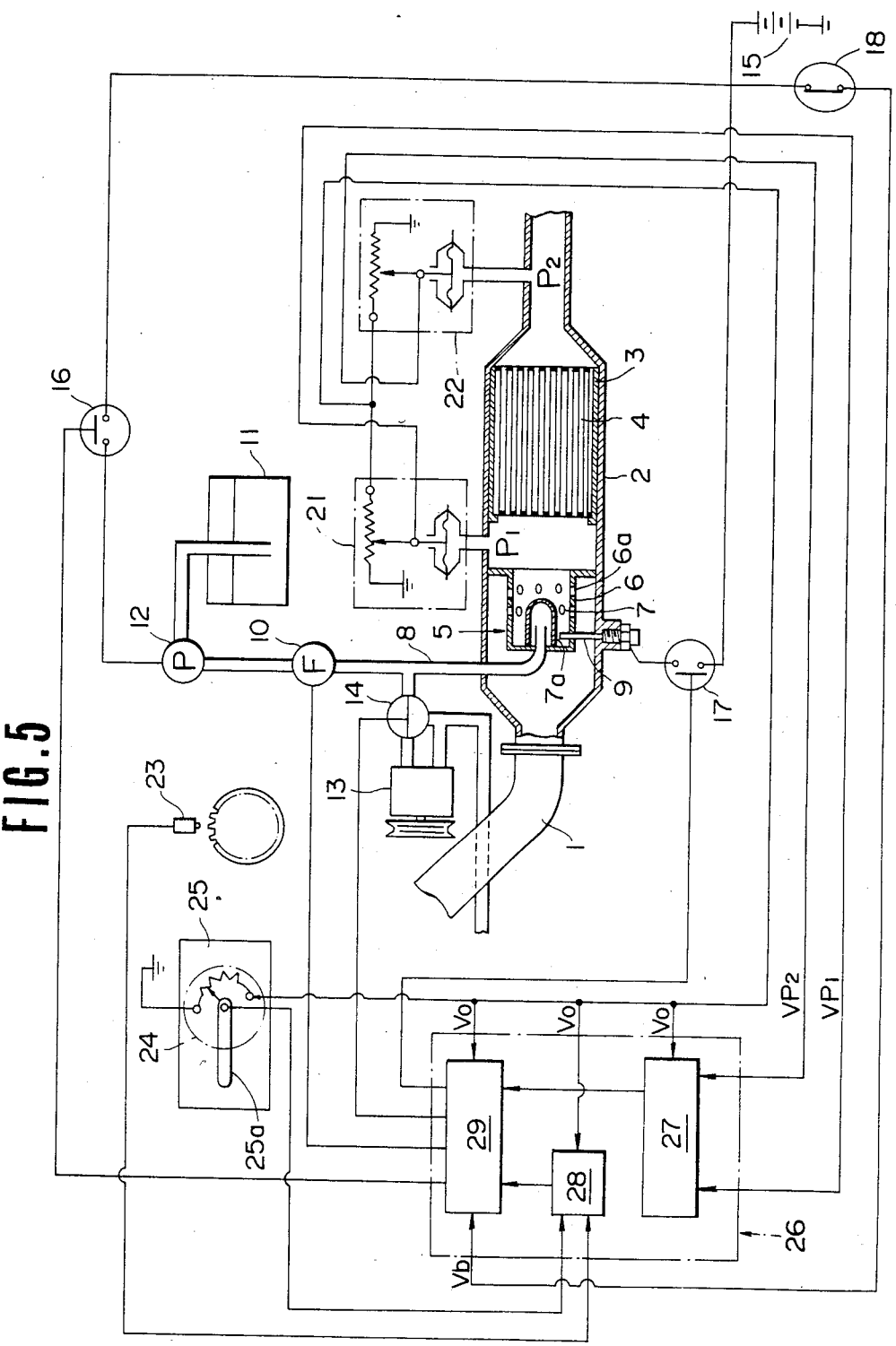
FIG. 5 is a schematic block diagram partially in section showing one embodiment of a trap regenerative device control apparatus of the present invention.

Referring to FIG. 5, there is illustrated one embodiment of a trap regenerative burner control apparatus made in accordance with the present invention. A trap casing 2 is connected at its inlet end to the exhaust conduit 1 of an internal combustion engine. The trap casing 2 contains a trap or particle filter 4 secured through a kuffer member 3 on the inner surface of the trap casing 2. The trap 4 has a honeycomb structure in which a first multiplicity of passageways closed at their inlet ends and a second multiplicity of passageways closed at their outlet ends are arranged alternatively so that exhaust particles can be collected therein while exhaust gases pass through the walls of the adjacent passageways.

A regenerative burner, which is generally designated at 5, is located within the trap casing 2 and is actuated to burn the particles collected in the trap 4 so as to regenerate the trap when a predetermined amount of particles is collected in the trap 4. The regenerative burner 5 includes a combustion cylinder 6 formed in its peripheral wall with a number of through-holes 6a through which exhaust gases enter the interior of the combustion cylinder 6. The combustion cylinder 6 contains a reverse-flow evaporation cylinder 7 which is formed in its peripheral wall with tiny frame jets 7a. An air-fuel mixture conduit 8 opens into the reverse-flow evaporation cylinder 7. The mixture conduit 8 communicates through a three-way valve 14 with the outlet side of an air pump 13 and also through a fuel injection valve 10 to a fuel pump 12 which is actuated to supply fuel from a fuel tank 11 to the fuel injection valve 10 when a relay controlled switch 16 is closed on command from a control unit 26 to connect the fuel pump 12 to a battery 15. The fuel injection valve 10 receives fuel injection pulses from the control unit 26 and operates to supply fuel into the mixture conduit 8. The three-way valve 14 is movable between two positions, the first position resulting in connection between the inlet and outlet sides of the air pump 13. The second position is encountered on command from the control unit 26 to disconnect the inlet and outlet sides of the air pump 13 and at the same time connect the air pump outlet side to the mixture conduit 8 so as to supply air into the mixture conduit 8 where it is mixed with the fuel supplied through the fuel injection valve 10.

A glow plug 9 is located in the combustion cylinder 6 near the frame jet 7a of the reverse-flow evaporation cylinder 7 and is actuated to increase the temperature in the combustion cylinder 6 to a level sufficient to ignite an air-fuel mixture therein when a relay controlled switch 17 is closed on command from the control unit 26 to connect the glow plug 9 to the battery 15.

A first pressure sensor 21, which includes a diaphragm device and a piezoelectric element shown as a potentiometer, measures the pressure (P1) on the inlet side of the trap 4 in the trap casing 2 and provides a voltage signal ($V_{P1}$) indicative of the measured pressure (P1) to the control unit 26. Similarly, a second pressure sensor 22, which includes a diaphragm device and a piezoelectric element shown as a potentiometer, measures the pressure (P2) on the outlet side of the trap 4 in the trap casing 2 and provides a voltage signal ($V_{P2}$) indicative of the measured pressure (P2) to the control unit 26. The use of these diaphragm devices can minimize the influence of exhaust gas heat on the pressure measurements.

An engine speed sensor 23, which is shown as a crankshaft position sensor, generates at its output a series of pulses at a repetitive rate corresponding to the engine speed. The output of the engine speed sensor 23 is coupled to the control unit 26. A load sensor 24, which is shown as including a potentiometer drivingly connected to the control lever 25a of a fuel injection pump 25, generates at its output voltage signal indicative of the engine load. The output of the load sensor 24 is coupled to the control unit 26.

The control unit 26 comprises a regeneration requirement decision circuit 27 which has an input from the first pressure sensor 21 and another input from the second pressure sensor 22 and generates at its output a regeneration command signal when the amount of the exhaust particles collected in the trap 4 is considered to reach the limit. The regeneration requirement decision circuit 27 determines the regeneration requirement by comparing the difference ($\Delta V_P = V_{P1} - V_{P2}$) with a threshold value ($\Delta V_{Pmax} = A \cdot V_{P1} - B$) and generates the regeneration command signal when the former is equal to or greater than the latter; that is, when the pressure differential existing across the trap reaches the threshold value given by equation (1). The regeneration requirement decision circuit 27 may be arranged to determine the regeneration requirement by comparing a ratio ($V_{P1} - V_{P2}$)/$V_{P1}$ or $V_{P2}/V_{P1}$ with a predetermined value and generate the regeneration command signal when the former is equal to or greater than the latter. The output of the regeneration requirement decision circuit 27 is coupled to a control circuit 29. A pulse generator 28 has inputs from the engine speed sensor 23 and the engine load sensor 24 and generates at its output valve drive pulses corresponding to the sensed engine speed and load. The output of the pulse generator 28 is coupled to the control circuit 29.

In the presence of the regeneration command signal from the regeneration requirement decision circuit 27, the control circuit 29 operates the regenerative burner 5 to regenerate the trap 4 by closing the relay switch 17 to actuate the glow plug 9, shifting the three-way valve 14 to the second position to supply air into the mixture conduit 8, closing the relay switch 16 to actuate the fuel pump 12, and passing valve drive pulses from the pulse generator 28 to operate the fuel injection valve 10 so as to supply fuel into the mixture conduit 8.

Figure 6:
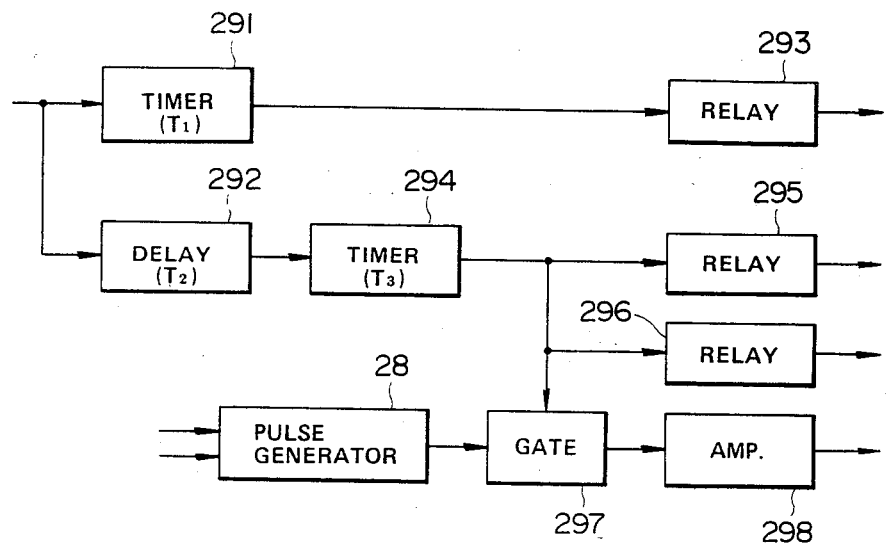
FIG. 6 is a schematic block diagram showing the details of the control circuit of FIG. 5.

Referring to FIG. 6, the control circuit 29 includes a first timer 291 which is connected at its input to the output of the regeneration requirement decision circuit 27. The output of the first timer 291 is coupled to a relay 293 which controls the relay switch 17. The first timer 291 is responsive to a regeneration command signal from the regeneration requirement decision circuit 27 to energize the relay 293 so as to close the relay switch 17, causing actuation of the glow plug 9 for a predetermined period of time (T1) after the application of the regeneration command signal or in response to the leading edge of the regeneration command signal.

The control circuit 29 also includes a second timer 294 which is connected at its input to the output of the regeneration requirement decision circuit 27 through a delay circuit 292. The output of the second timer 294 is coupled to a relay 295 which controls the three-way valve 14 and to a relay 296 which controls the relay switch 16. The delay switch 292 delays application of the regeneration command signal to the second timer 294 by a predetermined time (T2). The second timer 294 is responsive to the regeneration command signal fed thereto through the delay circuit 292 to energize the relay 295 so as to shift the three-way valve 14 to the second position supplying air to the mixture conduit 8 and also to energize the relay 296 so as to close the relay switch 16, causing the fuel pump 12 to start the supply of fuel to the fuel injection valve 10.

The output of the second timer 294 is also coupled to a gate circuit 297 which is responsive to a high signal from the second timer 294 to allow the passage of valve drive pulses from the pulse generator 28 to an amplifier 298. The output of the amplifier 298 is coupled to the fuel injection valve 10 which receives the fuel drive pulses and operates to supply fuel in amounts corresponding to the existing engine speed and load.

Figure 7:
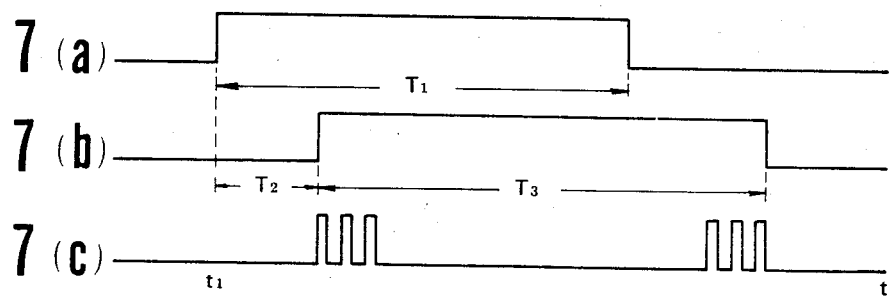
FIG. 7 contains three waveforms 7a, 7b and 7c obtained at various points in the schematic diagram of FIG. 6.

Referring to FIG. 7, at a time t1 when a regeneration command signal (high signal) occurs at the output of the regeneration requirement decision circuit 27, the first timer 291 is triggered by the leading or upward edge of the regeneration command signal to change its output to high, as shown in FIG. 7(a), causing the actuation of the glow plug 9 to increase the temperature in the combustion cylinder 6 to a level sufficient to ignite an air-fuel mixture therein. This condition continues for a time (T1) set in the first timer 291. On the other hand, the second timer 294 assumes a first state having a low output until a time (T2), which is set in the delay circuit 292, elapses, as shown in FIG. 7(b). When the time (T2) elapses, the second timer 294 changes to a second state having a high output, as shown in FIG. 7(b), causing the three-way valve 14 to shift to the second position supplying air into the mixture conduit 8 and the fuel pump 12 to supply fuel to the fuel injection valve 10. The high output of the second timer 294 also causes the gate circuit 297 to pass valve drive pulses from the pulse generator 28 to the fuel injection valve 10, as shown in FIG. 7(c), so as to supply fuel to the mixture conduit 8. The second state of the second timer 294 is held for a time (T3) set in the second timer 294. It is to be noted that the time (T2) is shorter than the time (T1) and the time (T1) is shorter than the time (T2) plug the time (T3).

The control circuit 29 includes a constant-voltage circuit connected through an engine key switch 30 to the battery 15 to supply a constant voltage (Vo) to the power terminals of the regeneration requirement decision circuit 27 and the pulse generator 28.

The operation is as follows:

Assuming now that the amount of the particles collected in the trap 4 is below the limit, the pressure differential across the trap 4 is below the threshold value and thus the regeneration requirement decision circuit 27 generates no regeneration command signal. As a result, the control circuit 29 maintains the regenerative burner 5 out of operation by holding the glow plug 9 deenergized, the three-way valve 14 in its first position, the fuel pump 14 deenergized, and the fuel injection valve 10 out of operation.

When the amount of the particles collected in the trap 4 reaches the limit, the pressure differential across the trap 4 reaches the threshold value and thus the regeneration requirement decision circuit 27 generates a regeneration command signal to the control circuit 29 which thereby operates the regenerative burner 5 to regenerate the trap 4 by immediately actuating the glow plug 9 while actuating the fuel pump 12, operating the fuel injection valve 10, and changing the three-way valve 14 to second position so as to supply an air-fuel mixture to the combustion cylinder 6 with a delay during which the glow plug 9 increases the temperature to a level sufficient to ignite the air-fuel mixture in the presence of excessive oxygen included in the exhaust gases.

The amount of fuel injected through the fuel injection valve 10, this being determined by the width of the valve drive pulses applied to the fuel injection valve 10, is determined in the pulse generator 28 based upon the outputs of the engine speed and load sensors 23 and 24 to maintain the inlet side of the trap 4 substantially at a constant temperature. In more detail, the width of the valve drive pulses applied to the fuel injection valve 10 is directly proportional to engine speed and inversely proportional to engine load.

The control circuit 29 deenergizes the glow plug 9 a predetermined time after its actuation and thereafter deenergizes the fuel injection valve 10 and the fuel pump 12 while at the same time returns the three-way valve 14 to the first position, thereby terminating the trap regeneration.

Figure 8:
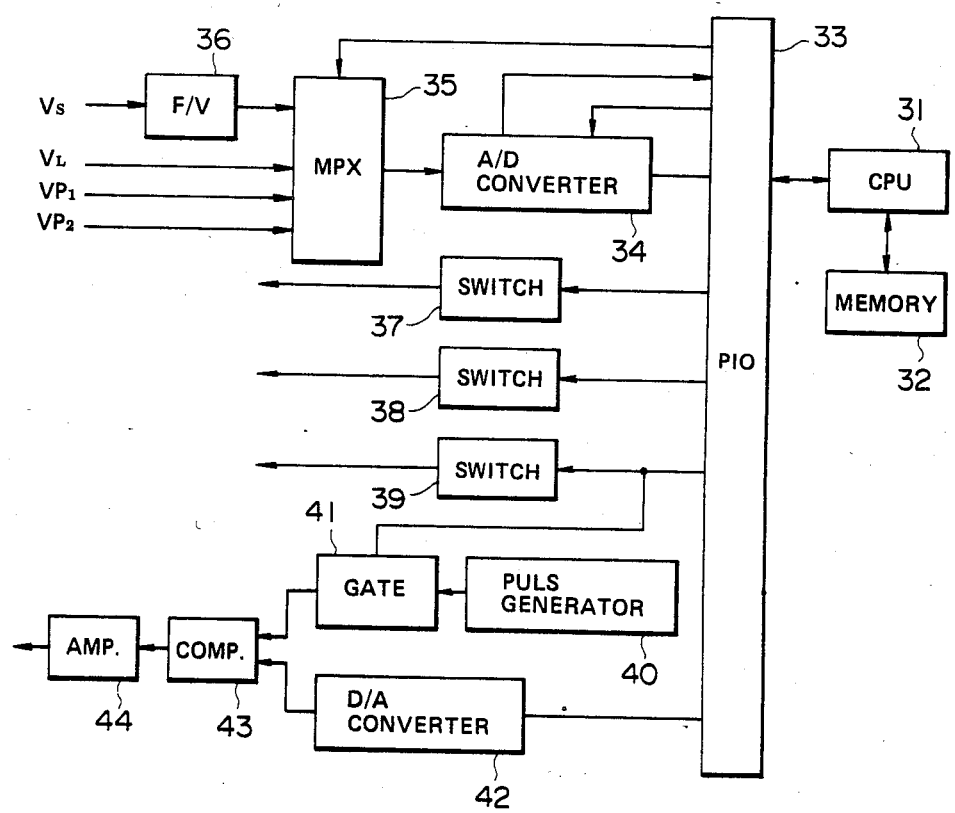
FIG. 8 is a schematic block diagram showing a modification of the embodiment of FIG. 5.

Referring to FIG. 8, a modification of the embodiment of FIG. 5 is illustrated which differs from the embodiment only in that the control unit 26 includes a digital computer capable of performing the arithmetic calculation of addition, subtraction, multiplication, and division on binary numbers. The digital computer comprises a central processing unit 31 in which the actual arithmetic calculations are performed and a memory 32. An analog-to-digital converter 34 is used to convert the analog sensor signals comprising the inputs to an analog multiplexer 35 into digital form. A frequency-to-voltage converter 36 is interposed between the engine speed sensor 23 and the analog multiplexer 35. A peripheral input/output device 33 interconnects the digital computer central processing unit 31 and its memory 32 with the analog-to-digital converter 34 and the analog multiplexer 35 and also with various output devices. These output devices include a first switch circuit 37 which controls the relay switch 17, a second switch circuit 38 which controls the three-way valve 14, a third switch circuit 39 which controls the relay switch 16, and a gate circuit 41.

The first switch circuit 37 is responsive to an "on" signal from the input/output device 33 to close the relay switch 17 so as to actuate the glow plug 9 and is responsive to an "off" signal from the input/output device to open the relay switch 17 to deenergize the glow plug 9. The second switch circuit 37 is responsive to an "on" signal from the input/output device 33 to shift the three-way valve 14 to the second position supplying air into the mixture conduit 8 and is responsive to an "off" signal from the input/output device to return the three-way valve 14 to the first position stopping the air supply to the mixture conduit 8. The third switch circuit 39 is responsive to an "on" signal from the input/output device to close the relay switch 16 to operate the fuel pump 12 so as to supply fuel to the fuel injection valve 10 and is responsive to an "off" signal from the input/output device to open the relay switch 16 to deenergize the fuel pump 12 so as to stop the fuel supply to the fuel injection valve 10.

The gate circuit 41 is responsive to an "on" signal from the input/output device 33 to couple the output of a triangular pulse generator 40 to one input of a comparator 43 which has another input from a digital-to-analog converter 42 into which a calculated value for fuel delivery requirement in the form of fuel-injection pulsewidth is transferred from the input/output device 33. The output of the comparator 43 is coupled through an amplifier 44 to the fuel injection valve 10. The gate circuit 41 is responsive to an "off" signal from the input/output device 33 to disconnect the triangular pulse generator 40 from the comparator 43.

Figure 9:
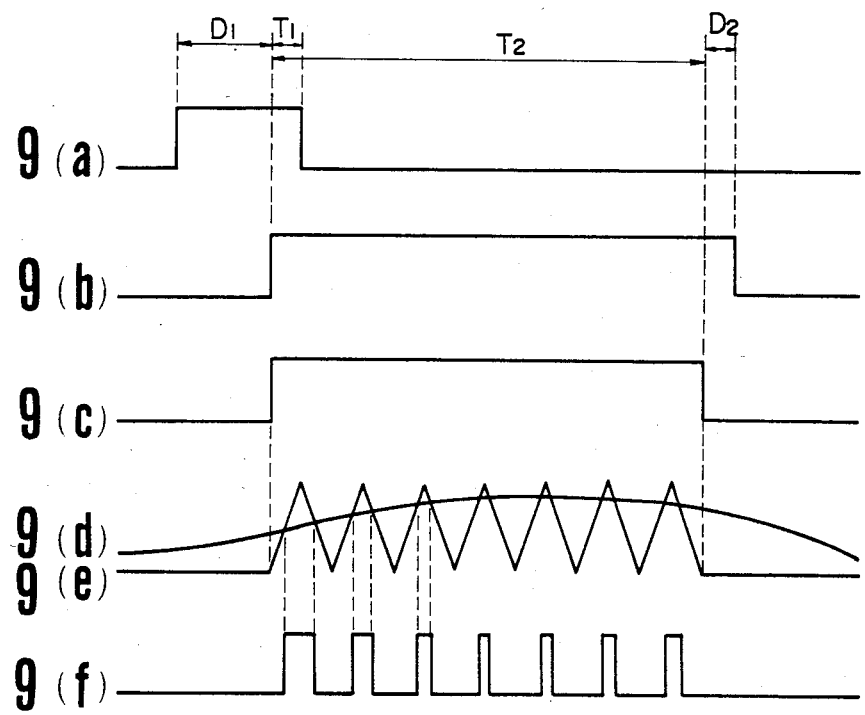
FIG. 9 contains six waveforms 9a, 9b, 9c, 9d, 9e and 9f obtained at various points in the schematic diagram of FIG. 8.

With particular reference now to FIG. 9, there are shown six voltage-versus-time waveforms obtained at various points in the schematic diagram of FIG. 8. FIGS. 9a, 9b and 9c illustrate voltage waveforms that appear as the outputs of the first, second and third switch circuits 37, 38 and 39, respectively. It can be seen that the outputs of the second and third switch circuits 38 and 39 change to high with a predetermined delay (D1) after the output of the first switch circuit 37 changes to high. The output of the first switch circuit 37 remains high until a predetermined time (D1 plus T1) elapses. The output of the second switch circuit 38 remains high until a predetermined time (T2 plus D2) elapses. The output of the third switch circuit 39 remains high until a predetermined time (T2) elapses.

The triangular pulse generator 40 generates a series of triangular pulses at predetermined repetitive period, as shown in FIG. 9e. The comparator 43 compares the output of the triangular pulse generator 42 with a voltage signal indicative of fuel delivery requirement from the digital-to-analog converter 42, as shown in FIG. 9d, to generate fuel injection pulses of a pulse width corresponding to the fuel delivery requirement, as shown in FIG. 9f, through the amplifier 44 to operate the fuel injection valve 10 when the gate circuit 41 opens to connect the triangular pulse generator 40 to the comparator 43.

The digital computer calculates a value for fuel delivery requirement in the form of fuel-injection pulsewidth based upon the existing engine speed and engine load and transfers the calculated value to the digital-to analog converter 42 which converts it into analog form for application to the comparator 43.

Figure 10:
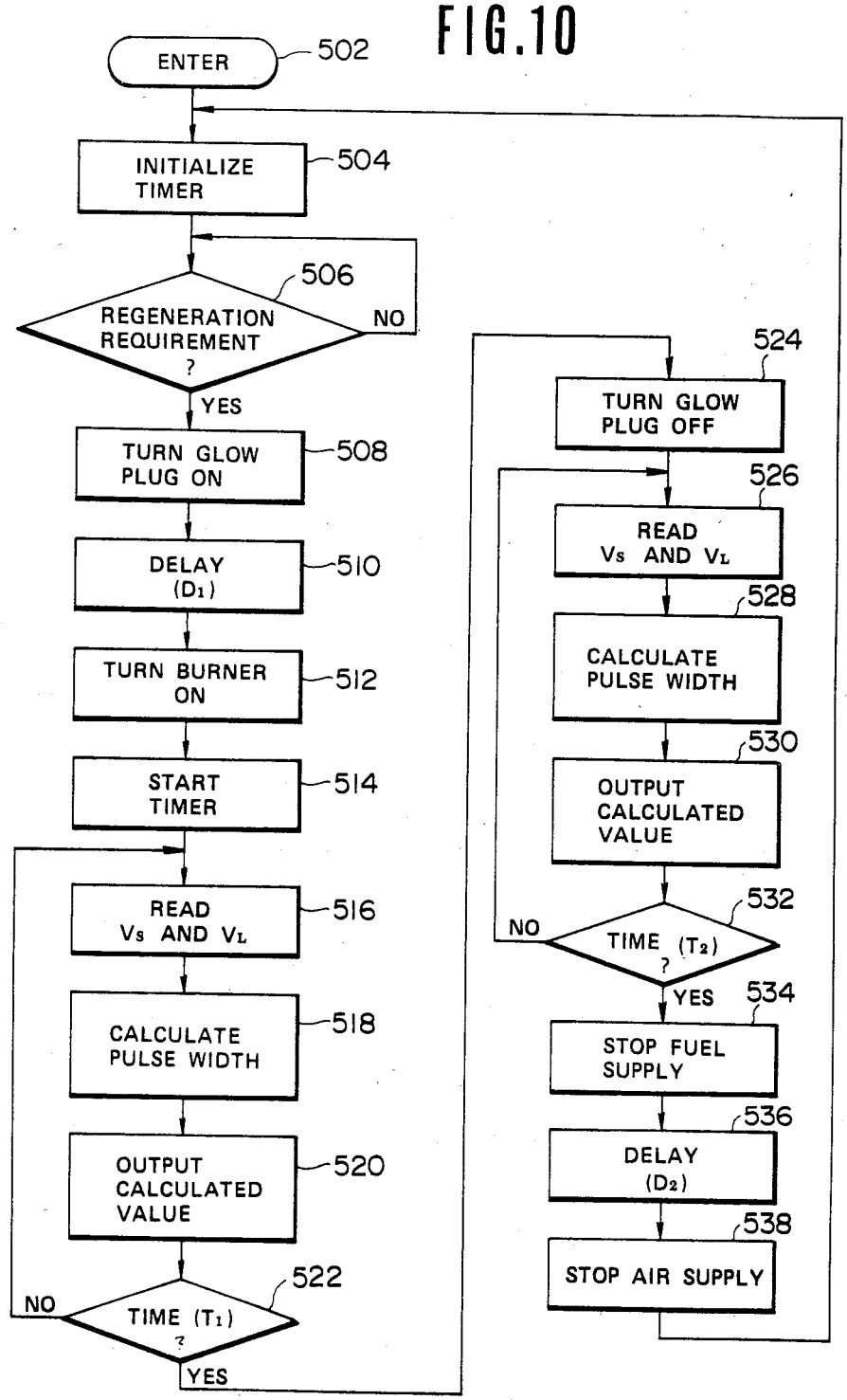
FIG. 10 is a flow diagram illustrative of the operation of the digital computer used in the control unit of FIG. 8.

FIG. 10 is a flow diagram of the programming of the digital computer of FIG. 8. The computer program is entered at the point 502. At the point 504 in the program, the digital computer central processing unit initializes a timer. At the point 506, a determination is made as to whether a regeneration requirement occurs. For this determination, the inputs ($V_{P1}$, $V_{P2}$) to the analog multiplexer 35 are, one by one, converted by the analog-to-digital converter 34 into digital form and read into the computer memory. To make this determination, the computer arithmetically calculates the pressure differential ($\Delta P = P1 - P2$) across the trap 4 based upon the read values ($V_{P1}$, $V_{P2}$) and a threshold value ($\Delta Pmax = A \cdot P1 - B$) based upon the read value ($V_{P1}$) and compares the calculated pressure differential ($\Delta P$) with the calculated threshold value ($\Delta Pmax$) and determines that a regeneration requirement occurs if the former is equal to or greater than the latter. Alternatively, the computer may arithmetically calculate a ratio ($V_{P1} - V_{P2})/V_{P1}$ or $V_{P2}/V_{P1}$ and compare the calculated ratio with a predetermined value and determine that a regeneration requirement occurs if the former is equal to or greater than the latter.

If the answer to this question is "no", then the program returns to the point 506. Otherwise, the program proceeds to the point 508 where the digital computer central processing unit causes the input/output device 33 to generate an "on" signal to the first switch circuit 37 which thereby closes the relay switch 17 to actuate the glow plug 9. After a predetermined delay (D1) at the point 510, the program proceeds to the point 512 where the digital computer central processing unit causes the input/output device to generate an "on"

signal to the second switch circuit 38 which thereby shifts the three-way valve 14 to the second position supplying air into the mixture conduit 8, while at the same time generate an "on" signal to the third switch circuit 39 which thereby closes the relay switch 16 to operate the fuel pump 12 to supply fuel to the fuel injection valve 10 and also to the gate circuit 41 which thereby couples the output of the triangular pulse generator 40 to one input of the comparator 43. At the following point 514, the digital computer central processing unit starts the timer operating.

At the point 516 in the program, the value of the voltage signal from the frequency-to-voltage converter 36 connected to the engine speed sensor 23 and the value of the voltage signal from the engine load sensor 24 are, one by one, converted into digital form and read into the computer memory. At the point 518, the fuel-delivery requirement, in the form of fuel-injection pulse-width, is calculated by looking up a table which stores signals with values indicative of fuel-injection pulse-width as functions of engine speed and engine load. At the point 520 in the program, the calculated value for fuel-injection pulse-width is outputted to the digital-to-analog converter 42. At the point 522, a determination is made as to whether the time period of operation of the timer exceeds a predetermined value (T1). The answer to this question is "no", then the program returns to the point 516 so as to repeat the steps necessary to calculate the fuel-injection pulse-width.

If the timer operation period exceeds the predetermined value (T1), then the program proceeds to the point 524 where the digital computer central processing unit causes the input/output device 33 to generate an "off" signal to the first switch circuit 37 which thereby opens the relay switch 17 to deenergize the glow plug 9.

Following this, the fuel-injection pulse-width is calculated again. That is, at the point 526, the value of the voltage signal from the frequency-to-voltage converter 36 connected to the engine speed sensor 23 and the value of the voltage signal from the engine load sensor 24 are, one by one, converted into digital form and read into the computer memory. At the point 528, the fuel-delivery requirement, in the form of fuel-injection pulse-width, is calculated by looking up the table which stores signals with values indicative of fuel-injection pulse-width as functions of engine speed and engine load. At the point 530, the calculated value for fuel-injection pulse-width is outputted to the digital-to-analog converter 42.

At the point 532, a determination is made as to whether the time period of operation of the timer exceeds a predetermined value (T2). If the answer to this question is "no", then the program returns to the point 526 so as to repeat the steps necessary to calculate the fuel-injection pulse-width.

If the timer operation period exceeds the predetermined value (T2), then the program proceeds to the point 534 where the digital computer central processing unit causes the input/output device 33 to generates an "off" signal to the gate circuit 41 which thereby disconnects the output of the triangular pulse generator from the comparator 43 and also to the third switch circuit 39 which thereby opens the relay switch 16 to deenergize the fuel pump 12, stopping the fuel supply to the fuel injection valve 10.

After a predetermined delay (D2) at the point 536, the program proceeds to the point 538 where the digital computer central processing unit causes the input/output device 33 to generate an "off" signal to the second switch circuit 38 which thereby returns the three-way valve 14 to the first position, stopping the air supply to the mixture conduit 8. Thereafter, the program returns to the point 504.

Figure 11:
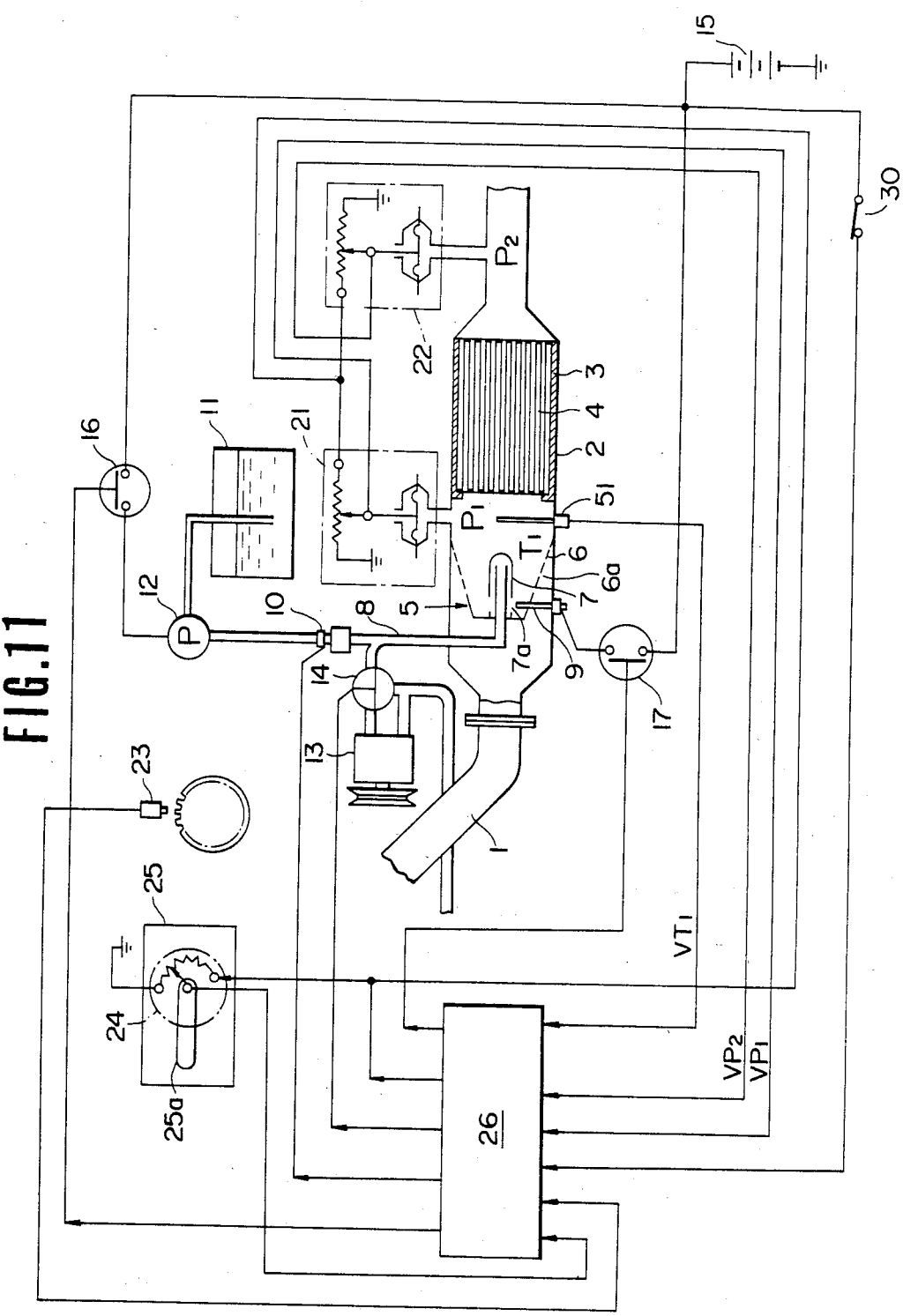
FIG. 11 is a schematic block diagram partially in section showing a second embodiment of the trap generative device control apparatus of the present invention.

Referring to FIG. 11, there is illustrated a second embodiment of the present invention which is generally the same as described in connection with the embodiment of FIG. 5 except that the control unit 26 comprises a digital computer capable of performing the arithmetic calculation of addition, subtraction, multiplication, and division on binary numbers, and that a temperature sensor 51 is provided to measure the temperature (T1) at the inlet side of the trap 4 and generate a voltage signal ($V_{T1}$) indicative of the measured temperature to the control unit 26. Parts in FIG. 11 which are like those in FIG. 5 have been given the same reference numerals. The control unit 26 is connected through the engine key switch 30 to the battery 15.

Figure 12:
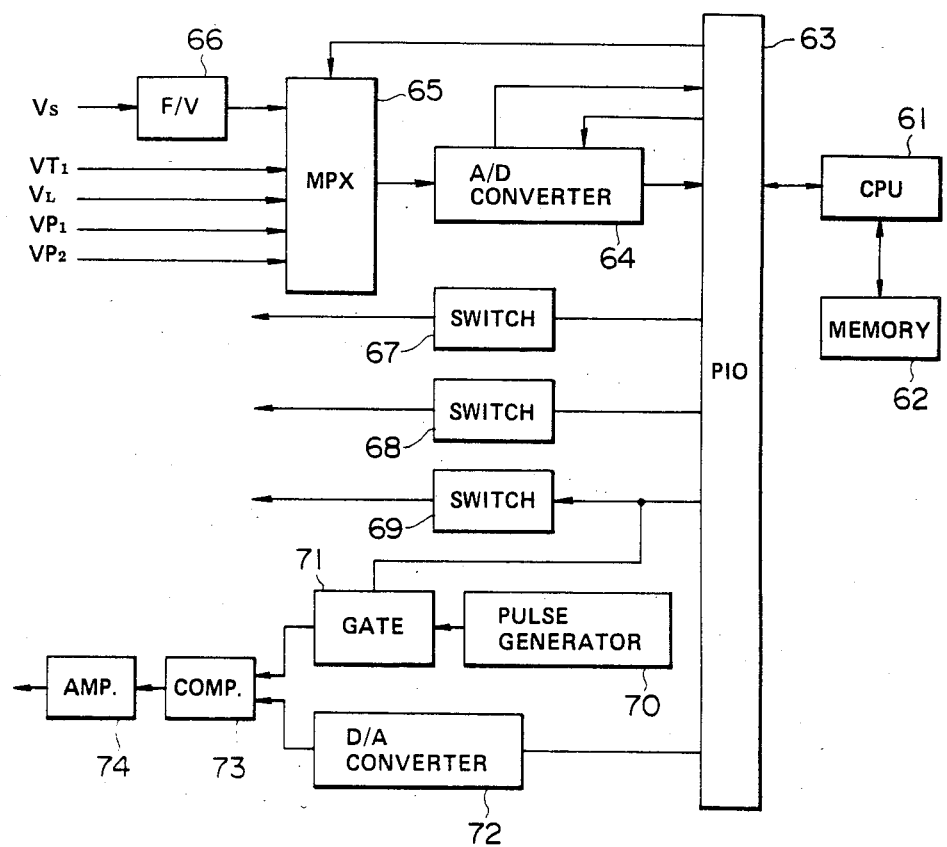
FIG. 12 is a schematic block diagram showing the details of the control unit of FIG. 11.

Referring to FIG. 12, the control unit 26 comprises a digital computer which includes a central processing unit 61 in which the actual arithmetic calculations are performed and a memory 62. An analog-to-digital converter 64 is used to convert the analog sensor signals comprising the inputs to an analog multiplexer 65 into digital form. A frequency-to-voltage converter 66 is interposed between the engine speed sensor 23 and the analog multiplexer 65. A peripheral input/output device 63 interconnects the digital computer central processing unit 61 and its memory 62 with the analog-to-digital converter 64 and the analog multiplexer 65 and also with various output devices. The output devices include a first switch circuit 67 which controls the relay switch 17, a second switch circuit 68 which controls the three-way valve 14, a third switch circuit 69 which controls the relay switch 16, and a gate circuit 71.

The first switch circuit 67 is responsive to an "on" signal from the input/output device 63 to close the relay switch 17 to actuate the glow plug 9 and is responsive to an "off" signal from the input/output device 63 to open the relay switch 17 to deenergize the glow plug 9. The second switch circuit 67 is responsive to an "on" signal from the input/output device 63 to shift the three-way valve 14 to the second position supplying air into the mixture conduit 8 and is responsive to an "off" signal from the input/output device to return the three-way valve 14 to the first position stopping the air supply to the mixture conduit 8. The third switch circuit 69 is responsive to an "on" signal from the input/output device 63 to close the relay switch 16 to operate the fuel pump 12 so as to supply fuel to the fuel injection valve 10 and is responsive to an "off" signal from the input/output device to open the relay switch 16 to deenergize the fuel pump 12 so as to stop the fuel supply to the fuel injection valve 10.

The gate circuit 71 is responsive to an "on" signal from the input/ouput device 63 to couple the output of a triangular pulse generator 70 to one input of a comparator 73 which has another input from a digital-to-analog converter 72 into which a calculated value for fuel delivery requirement in the form of fuel-injection pulse-width is transferred from the input/output device 63. The output of the comparator 73 is coupled through an amplifier 74 to the fuel injection valve 10. The gate circuit 71 is responsive to an "off" signal from the input/output device 63 to disconnect the triangular pulse generator 70 from the comparator 73.

Figure 13:
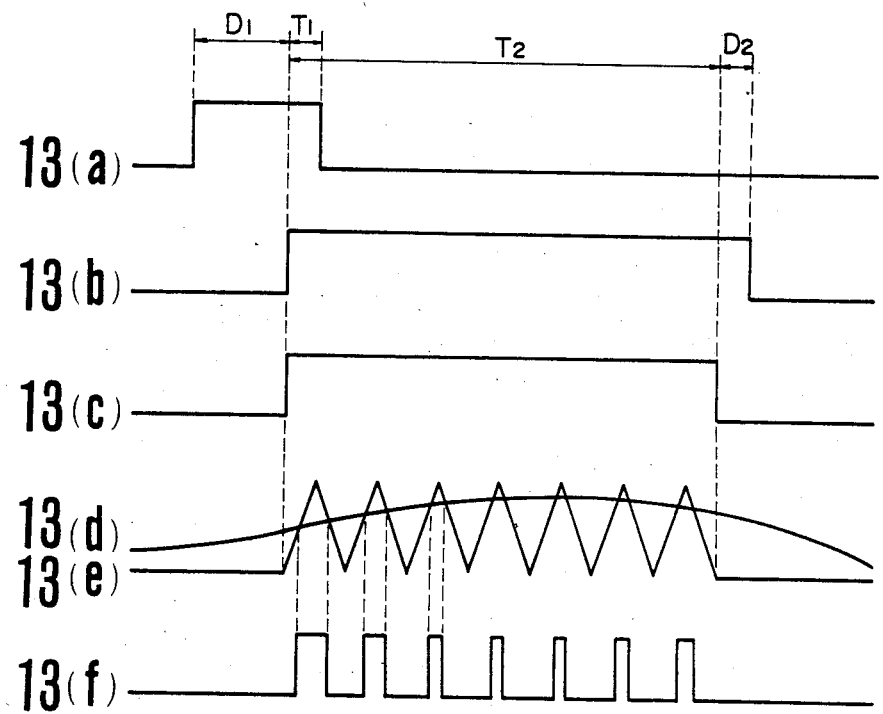
FIG. 13 contains six waveforms 13a, 13b, 13c, 13d, 13e and 13f obtained at various points in the schematic diagram of FIG. 12.

Referring to FIG. 13, there are shown six voltage-versus-time waveforms obtained at various points in the schematic diagram of FIG. 12. FIGS. 13a, 13b and 13c illustrate voltage waveforms that appear as the outputs of the first, second and third switch circuits 67, 68 and 69, respectively. It can be seen that the outputs of the second and third switch circuits 68 and 69 change to high with a predetermined delay (D1) after the output of the first switch circuit 67 changes to high. The output of the first switch circuit 67 remains high until a predetermined time (D1 plus T1) elapses. The output of the second switch circuit 68 remains high until a predetermined time (T2 plus D2) elapses. The output of the third switch circuit 69 remains high until a predetermined time (T2) elapses.

The triangular pulse generator 70 generates a series of triangular pulses at predetermined repetitive period, as shown in FIG. 13e. The comparator 73 compares the output of the triangular pulse generator 72 with a voltage signal indicative of fuel delivery requirement from the digital-to-analog converter 72, as shown in FIG. 13d, to generate fuel injection pulses of a pulse width corresponding to the fuel delivery requirement, as shown in FIG. 13f, through the amplifier 74 to operate the fuel injection valve 10 when the gate circuit 71 opens to connect the triangular pulse generator 70 to the comparator 73.

The digital computer calculates a value for fuel delivery requirement in the form of fuel-injection pulse-width based upon the existing engine speed and engine load and corrects the calculated value for the temperature T1 at the inlet side of the trap 4. The digital computer transfers the corrected value to the digital-to-analog converter 72 which converts it into analog form for application to the comparator 73.

Figure 14A:
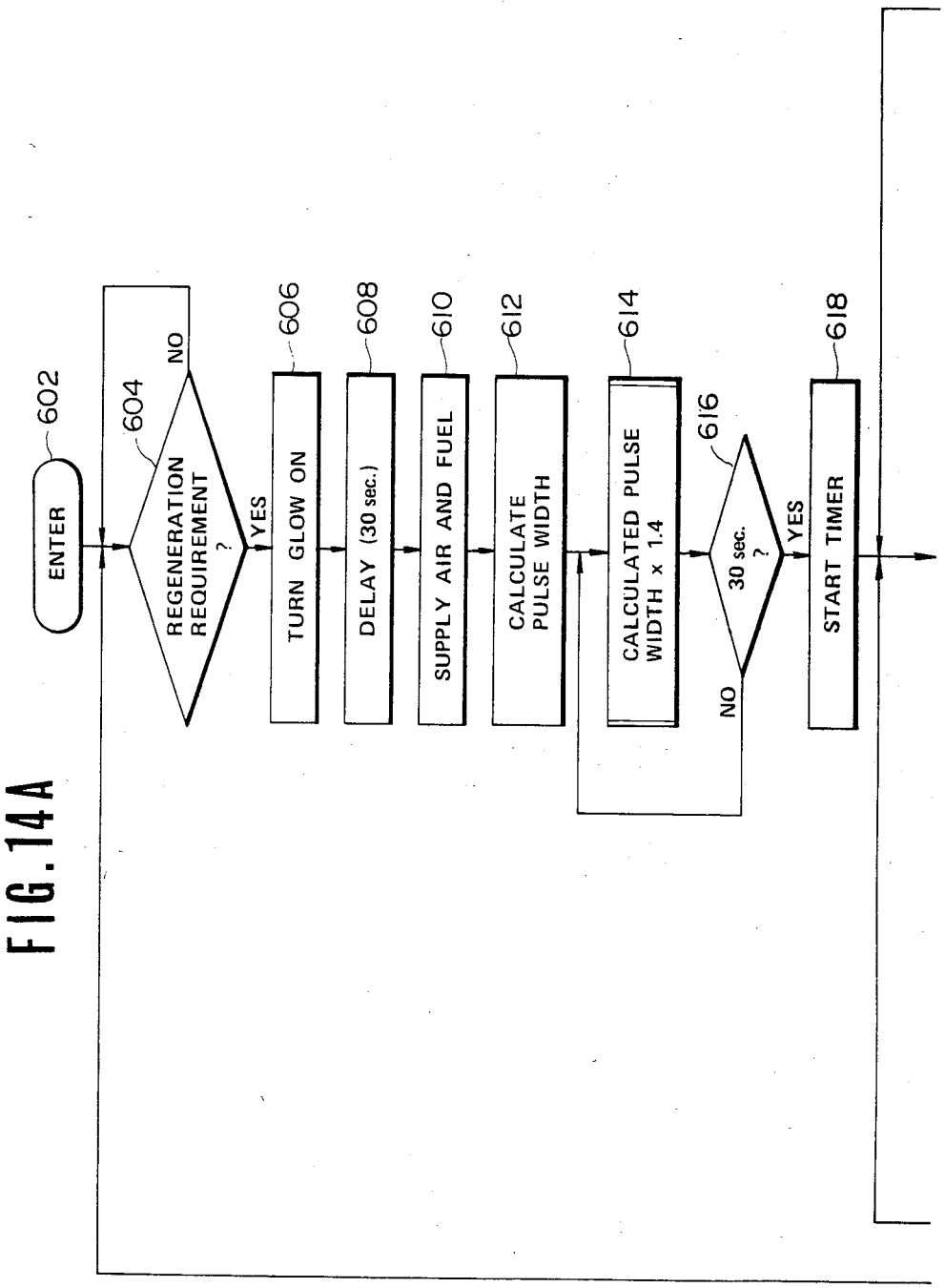

FIGS. 14A and 14B are a sequence flow diagram of the programming of the digital computer of FIG. 12. The computer program is entered at the point 602. At the point 604 in the program, a determination is made as to whether a regeneration requirement occurs. For this determination, the inputs ($V_{P1}$, $V_{P2}$) to the analog multiplexer 65 are, one by one, converted by the analog-to-digital converter 64 into digital form and read into the computer memory. To make this determination, the computer arithmetically calculates the pressure differential ($\Delta P = P1 - P2$) across the trap 4 based upon the read values ($V_{P1}$, $V_{P2}$) and a threshold value ($\Delta P_{max} = A \cdot P1 - B$) based upon the read value ($V_{P1}$) and compares the calculated pressure differential ($\Delta P$) with the calculated threshold value ($\Delta P_{max}$) and determines that a regeneration requirement occurs if the former is equal to or greater than the latter. Alternatively, the computer may arithmetically calculate a ratio ($V_{P1} - V_{P2})/V_{P1}$ or $V_{P2}/V_{P1}$ and compare the calculated ratio with a predetermined value and determine that a regeneration requirement occurs if the former is equal to or greater than the latter.

If the answer to this question is "no", then the program returns to the point 604. Otherwise, the program proceeds to the point 606 where the digital computer central processing unit causes the input/output device 63 to generate an "on" signal to the first switch circuit 67 which thereby closes the relay switch 17 to actuate the glow plug 9. After a predetermined delay (D1), for example, 30 seconds at the point 608, the program proceeds to the point 610. During the delay (D1), the glow plug 9 increases the temperature in the combustion cylinder 6 to a level sufficient to ignite an air-fuel mixture. At the point 610, the digital computer central processing unit causes the input/output device 63 to generate an "on" signal to the second switch circuit 68 which thereby shifts the three-way valve 14 to the second position supplying air into the mixture conduit 8, while at the same time generate an "on" signal to the third switch circuit 69 which thereby closes the relay switch 16 to operate the fuel pump 12 to supply fuel to the fuel injection valve 10 and also to the gate circuit 71 which thereby couples the output of the triangular pulse generator 70 to one input of the comparator 73.

At the point 612 in the program, the fuel-delivery requirement, in the form of fuel-injection pulse-width, is calculated by looking up a table which stores signals with values indicative of fuel-injection pulse-width as functions of engine speed and engine load. For this purpose, the value of the voltage signal from the frequency-to-voltage converter 66 connected to the engine speed sensor 23 and the value of the voltage signal from the engine load sensor 24 are, one by one, converted into digital form and read into the computer memory.

At the point 614 in the program, the digital computer central processing unit corrects the calculated fuel-injection pulse-width by multiplying it by 1.4 and outputs the corrected value to the digital-to-analog converter 72. At the point 616, a determination is made as to whether the time period of the air-fuel mixture supply exceeds a predetermined time (30 seconds). If the answer to this question is "no", then the program returns to the point 614. These operational steps are intended to supply a rich air-fuel mixture into the combustion chamber 6 so as to facilitate ignition in the early stage of the trap generation. If the time period of the air-fuel mixture supply exceeds the predetermined time, then the program proceeds to the point 618 where the computer starts a regeneration timer operating.

At the point 620 in the program, a determination is made as to whether the temperature (T1) at the inlet side of the trap 4 is above a predetermined value (500° C.). For this determination, the input ($V_{T1}$) to the analog multiplexer 65 is converted by the analog-to-digital converter 64 into digital form and read into the computer memory. If the answer to this question is "no", then the program proceeds to the point 622 where the computer generates or continues to generate the "on" signal to the first switch circuit 67 which thereby opens or continues to open the relay switch 17 so as to deenergize the glow plug 9. At the point 624, the computer corrects the calculated fuel-injection pulse-width by multiplying it by 1.4 so as to increase the amount of fuel to be supplied into the mixture conduit 8. At the following point 626, a determination is made as to whether the time period of the fuel control under the condition where the temperature T1 is 500° C. or less exceeds a predetermined time (20 seconds). If the answer to this question is "no", then the program returns to the point 620. Otherwise, the program proceeds to the point 628 where the computer generates an "off" signal to the first switch circuit 67 which thereby opens the relay switch 17 to deenergize the glow plug 9. Following this, the program proceeds to the point 644 where the computer generates an "off" signal to the third switch circuit 69 which thereby opens the relay switch 16 to deenergize the fuel pump and also to the gate circuit 71 which thereby disconnects the triangular pulse generator 70 from the comparator 73, thereby stopping the supply of fuel to the mixture conduit 8. These steps are intended to stop the trap regeneration and start new one again if the temperature T1 at the inlet side of the trap 4 does not reach the lower limit (500° C.) for a predetermined time, this condition indicating no ignition or misfire in the burner 5.

If the temperature T1 at the inlet side of the trap 4 is above 500° C. at the point 620, then the program proceeds to the point 630 where the computer generates an "off" signal to the first switch circuit 67 which thereby opens the relay switch 17 to deenergize the glow plug 9. Following this, the program proceeds to a determination step at the point 632. This determination is as to whether the temperature T1 at the inlet side of the trap 4 is above a predetermined temperature (550° C.). If the answer to this question is "no", then the program proceeds to the point 636 where the calculated fuel-injection pulse-width is corrected by multiplying it by 1.1 so as to create a relatively rich air-fuel mixture in the mixture conduit 8. Following this, the program proceeds to a determination step at the point 642 which will be described later.

If the temperature T1 is above 550° C. at the point 632, then at the point 634, another determination is made as to whether the temperature T1 at the inlet side of the trap 4 is below a predetermined value (650° C.). If the answer to this question is "no", then the program proceeds to the point 638 where the calculated fuel-injection pulse-width is corrected by multiplying it by 0.9 so as to create a lean air-fuel mixture in the mixture conduit 8. Following this, the program proceeds to the point 642.

If the temperature T1 is below 650° C. at the point 634, then the program proceeds to the point 640 where the calculated fuel-injection pulse-width is outputted to the digital-to-analog converter 72 without any correction. Following this, the program proceeds to the point 642 where a determination is made as to whether the value of the regeneration timer which indicates the time period of the trap regeneration exceeds a predetermined value (10 minutes). If the answer to this question is "no", then the program returns to the point 620. Otherwise, the program proceeds to the point 644 where the computer generates an "off" signal to the third switch circuit 69 which thereby opens the relay switch 16 to deenergize the fuel pump and also to the gate circuit 71 which thereby disconnects the triangular pulse generator 70 from the comparator 73, thereby stopping the supply of fuel to the mixture conduit 8.

After a delay (30 seconds) at the point 646, the program proceeds to the point 648 where the computer generates an "off" signal to the second switch circuit 68 which thereby returns the three-way valve 14 to the first position stopping the air supply to the mixture conduit 8 so as to terminate the trap regeneration. Following this, the program returns to the point 604.

This embodiment can maintain the inlet side of the trap at an optimum temperature regardless of ambient temperature and other meterological conditions by modifying the fuel delivery requirement determined based upon engine speed and engine load for the temperature on the inlet side of the trap.

Figure 15:
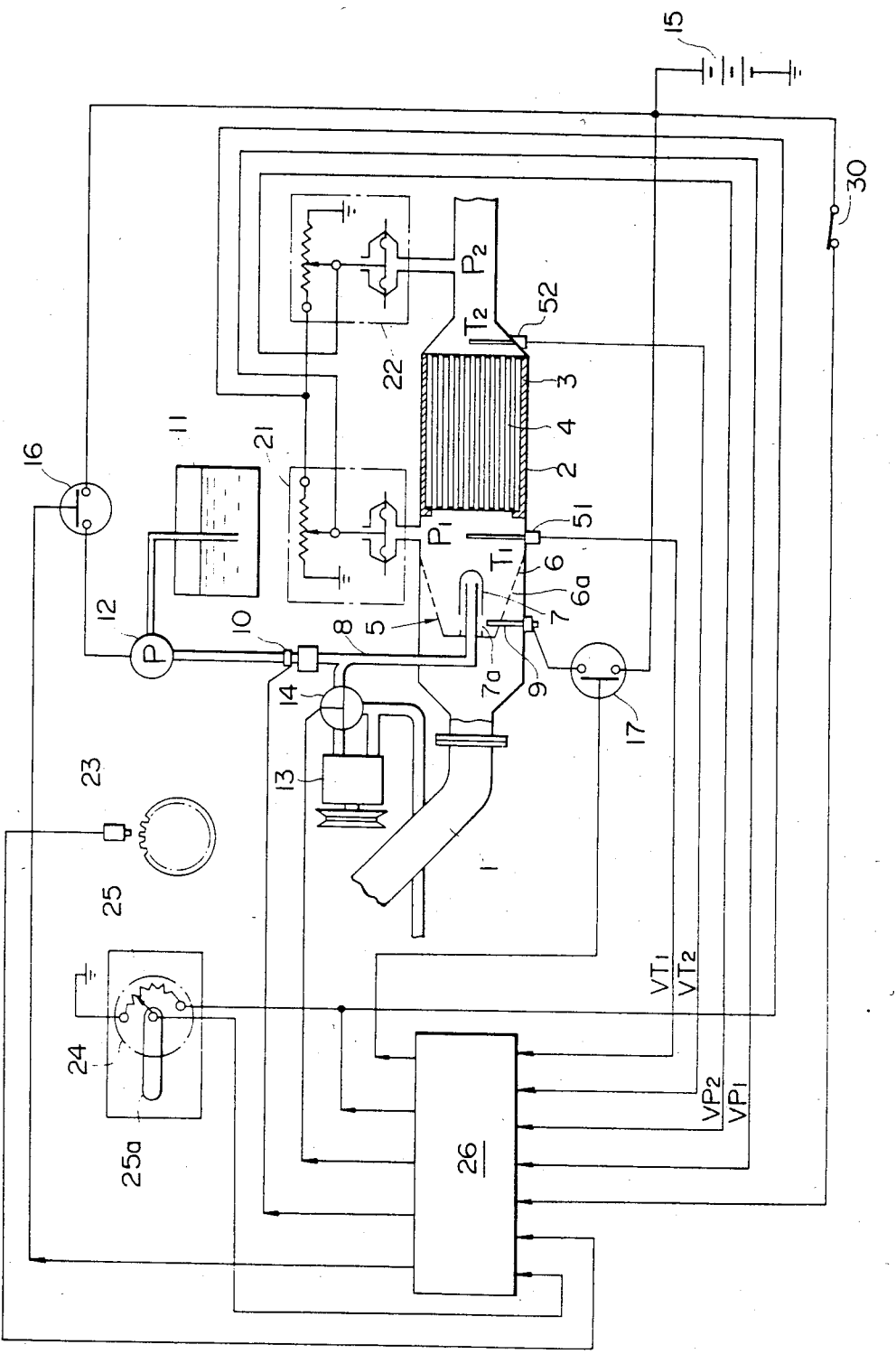
FIG. 15 is a schematic block diagram partially in section showing a third embodiment of the trap generative device control apparatus of the present invention.

Referring to FIG. 15, there is illustrated a third embodiment of the present invention which is generally the same as described in connection with the embodiment of FIGS. 11 and 12 except that a second temperature sensor 52 is provided to measure the temperature (T2) on the outlet side of the trap 4 and generates a voltage signal ($V_{T2}$) indicative of the measured temperature to the control unit 26. Parts in FIG. 15 which is like those in FIG. 11 have been given the same reference numerals and will not be repeated here. Similarly, the control unit 26 shown in FIG. 16 is generally the same as shown in FIG. 12 except that a voltage signal ($V_{T2}$) from the second temperature sensor 52 is additionally applied to the analog multiplexer 65, hence a detailed description will be omitted to avoid duplicity.

Figure 16:
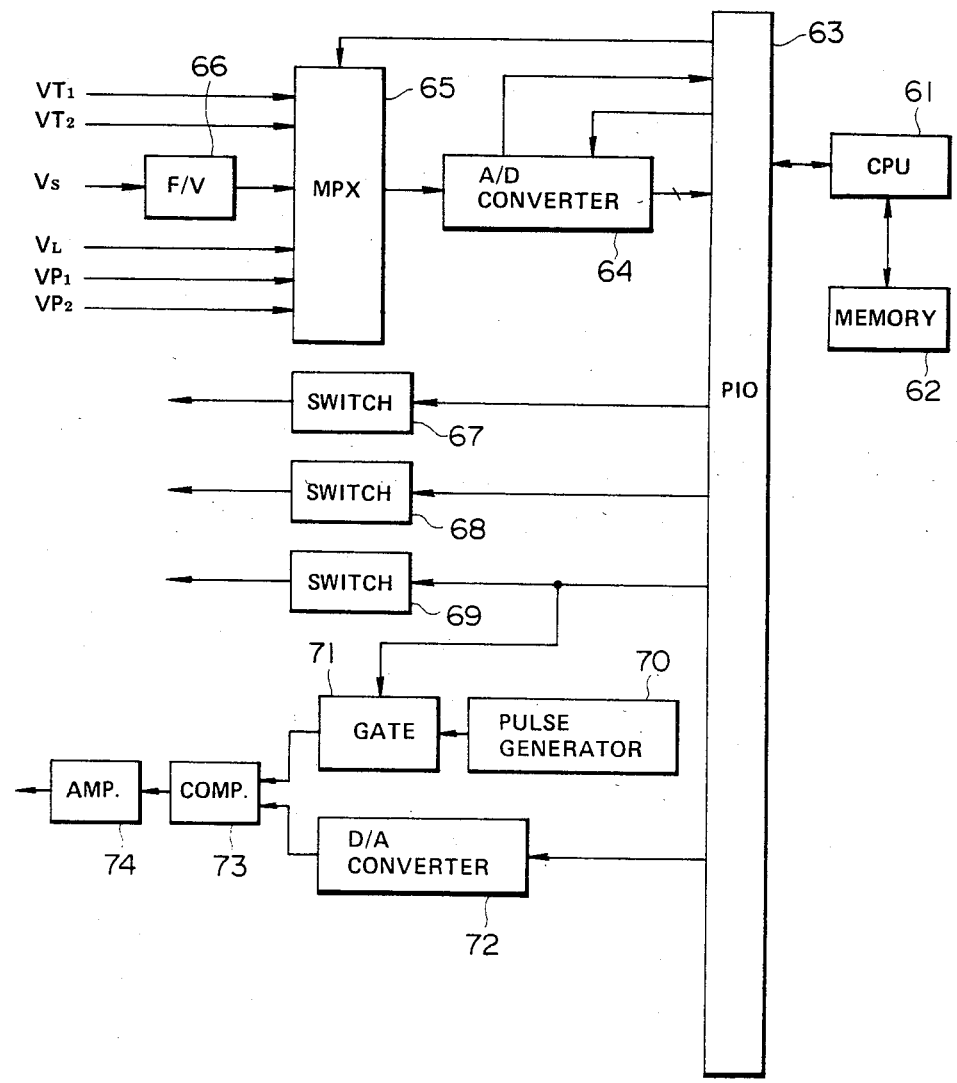
FIG. 16 is a schematic block diagram showing the details of the control unit of FIG. 15.
Figure 17A:
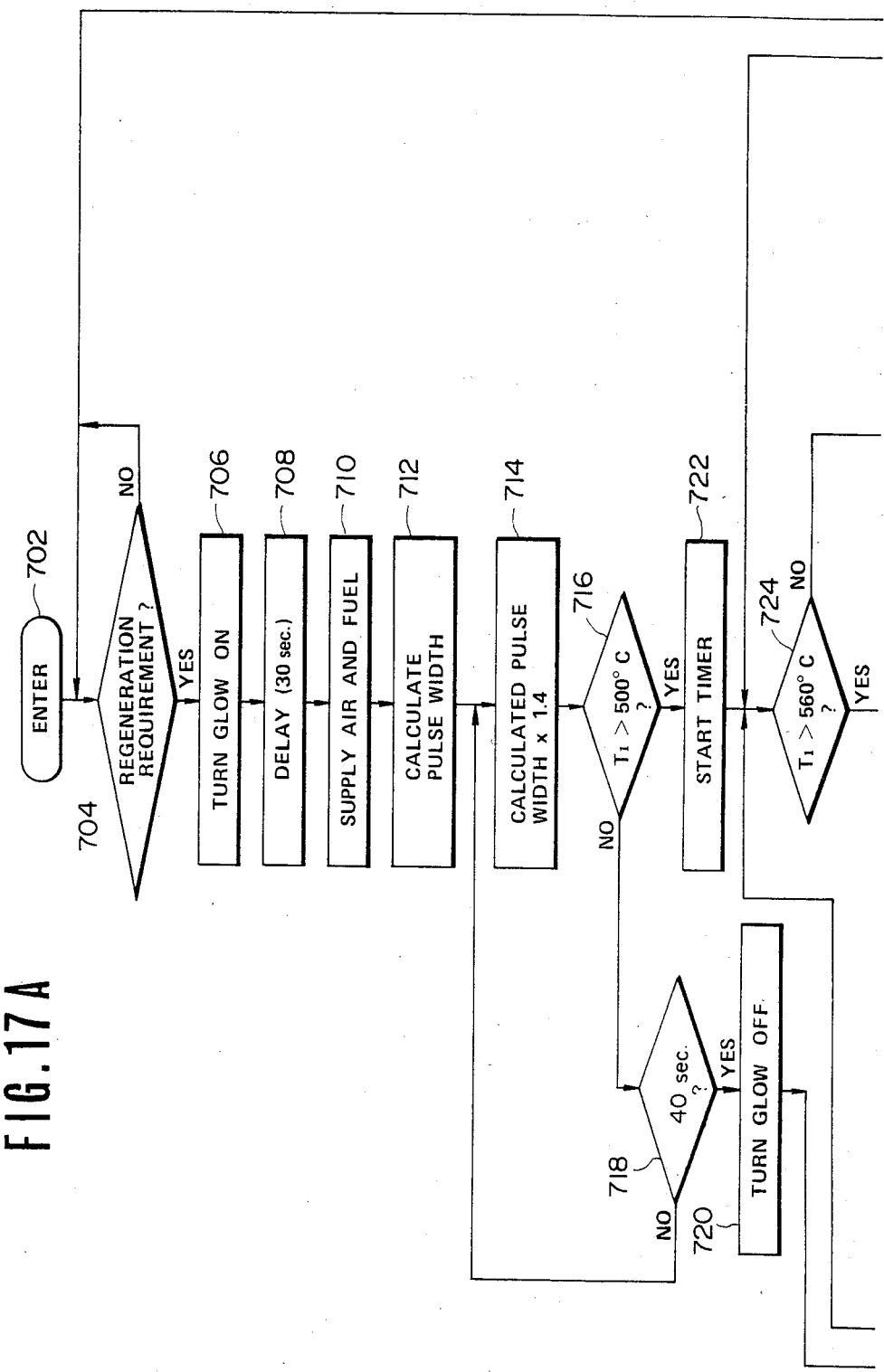
FIGS. 17A and 17B are a sequence of flow diagram illustrative of the operation of the digital computer used in the control unit of FIG. 16.
Figure 17B:
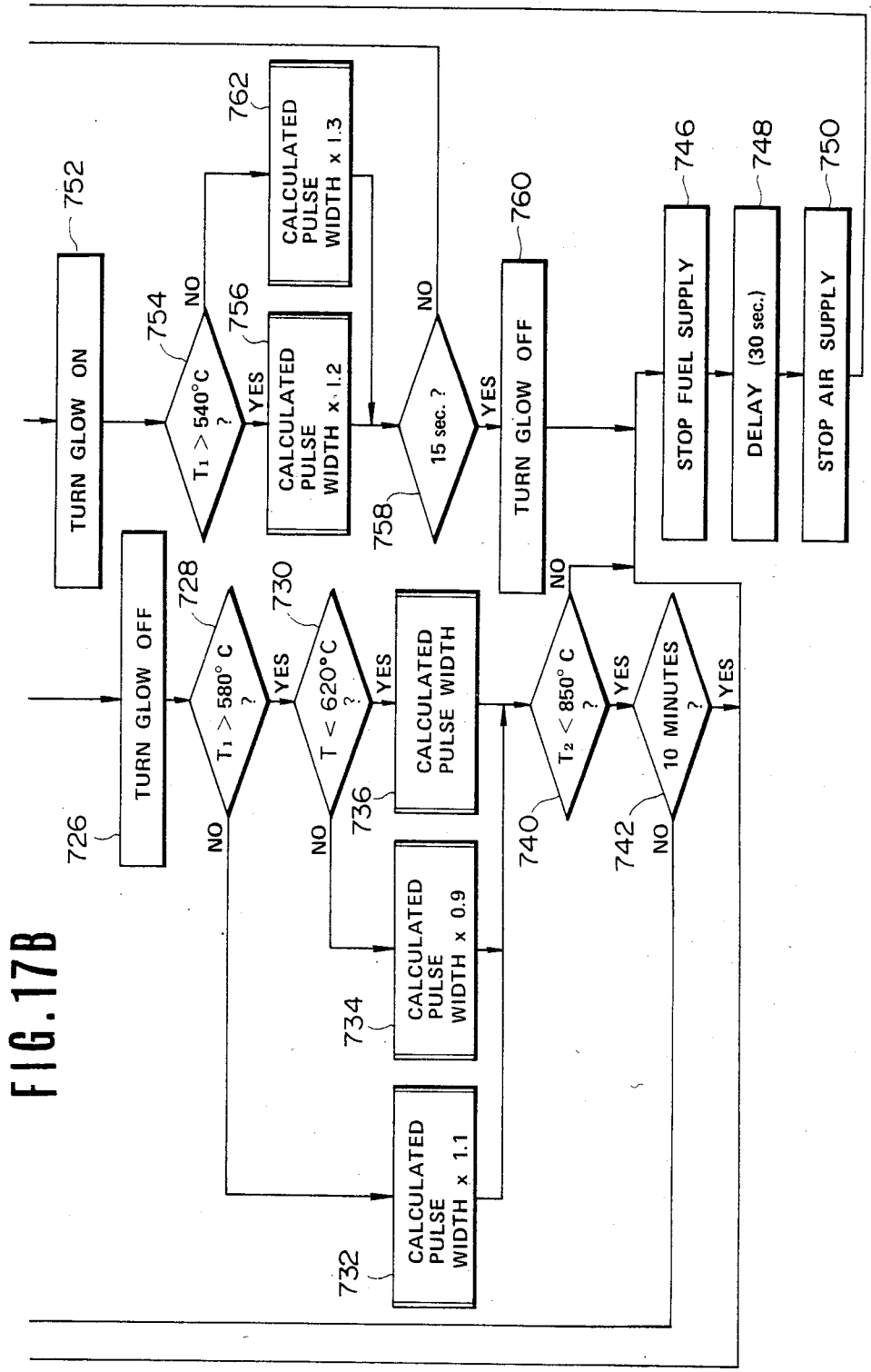

FIGS. 17A and 17B are a sequence of flow diagram of the programming of the digital computer of FIG. 16. The computer program is entered at the point 702. At the point 704 in the program, a determination is made as to whether a regeneration requirement occurs. For this determination, the inputs ($V_{P1}$, $V_{P2}$) to the analog multiplexer 65 are, one by one, converted by the analog-to-digital converter 64 into digital form and read into the computer memory. To make this determination, the computer arithmetically calculates the pressure differential ($\Delta P = P1 - P2$) across the trap 4 based upon the read values ($V_{P1}$, $V_{P2}$) and a threshold value ($\Delta Pmax = A \cdot P1 - B$) based upon the read value ($V_{P1}$) and compares the calculated pressure differential ($\Delta P$) with the calculated threshold value ($\Delta Pmax$) and determines that a regeneration requirement occurs if the former is equal to or greater than the latter. Alternatively, the computer may arithmetically calculated a ratio ($V_{P1} - V_{P2})/V_{P1}$ or $V_{P2}/V_{P1}$ and compare the calculated ratio with a predetermined value and determine that a regeneration requirement occurs if the former is equal to or greater than the latter.

If the answer to this question is "no", then the program returns to the point 704. Otherwise, the program proceeds to the point 706 where the digital computer central processing unit causes the input/output device 63 to generate an "on" signal to the first switch circuit 67 which thereby closes the relay switch 17 to actuate the glow plug 9. After a predetermined delay (30 seconds) at the point 708, the program proceeds to the point 710. During the delay, the glow plug 9 increases the temperature in the combustion cylinder 6 to a level sufficient to ignite an air-fuel mixture supplied therein. At the point 710, the computer causes the input/output device 63 to generate an "on" signal to the second switch circuit 68 which thereby shifts the three-way valve 14 to the second position supplying air into the mixture conduit 8, while at the same time generate an "on" signal to the third switch circuit 69 which thereby closes the relay switch 16 to operate the fuel pump 12 to supply fuel to the fuel injection valve 10 and also to the gate circuit 71 which thereby couples the output of the triangular pulse generator 70 to one input of the comparator 73 so as to supply fuel into the mixture conduit 8.

At the point 712 in the program, the fuel-delivery requirement, in the form of fuel-injection pulse-width, is calculated by looking up a table which stores signals with values indicative of fuel-injection pulse-width as functions of engine speed and engine load. For this purpose, the value of the voltage signal from the frequency-to-voltage converter 66 connected to the engine speed sensor 23 and the value of the voltage signal from the engine load sensor 24 are, one by one, converted into digital form and read into the computer memory.

At the point 714 in the program, the computer corrects the calculated fuel-injection pulse-width by multiplying it by 1.4 and outputs the corrected value to the digital-to-analog converter 72. At the point 716, a determination is made as to whether the temperature T1 at the inlet side of the trap 4 is above a predetermined value (500° C.). If the answer to this question is "no", then the program proceeds to another determination step at the point 718. This determination is as to whether the time period of supply of air-fuel mixture exceeds a predetermined time (40 seconds). If the answer to this question is "no", then the program returns to the point 714. These operational steps are intended to supply a rich air-fuel mixture into the combustion chamber 6 in the early stage of the trap generation until the time period of supply of air-fuel mixture exceeds a predetermined time (40 seconds). If the mixture supply time period exceeds 40 seconds at the point 718, then the program proceeds to the point 720 where the computer generates an "off" signal to the first switch circuit 67 which thereby opens the relay switch 17 to deenergize the glow plug 9. Following this, the program proceeds to the point 746 where the computer generates an "off" signal to the third switch circuit 69 which thereby opens the relay switch 16 to deenergize the fuel pump and also to the gate circuit 71 which thereby disconnects the triangular pulse generator 70 from the comparator 73 thereby stopping the supply of fuel to the mixture conduit 8. These steps are intended to stop the trap regeneration and start new one again if the temperature T1 at the inlet side of the trap 4 does not reach the lower limit (500° C.) for a predetermined time, this condition indicating no ignition or misfire in the burner 5.

If the temperature T1 at the inlet side of the trap 4 is above 500° C. at the point 716, then the program proceeds to the point 722 where the computer starts a regeneration timer operating. At the point 724, a determination is made as to whether the temperature T1 at the inlet of the trap 4 is above a predetermined value (560° C.). If the answer to this question is "yes", then the program proceeds to the point 726 wherein the computer generates an "off" signal to the first switch circuit 67 which thereby opens the relay switch 17 to deenergize the glow plug 9. Following this, the program proceeds to a determination step at the point 728. This determination is as to whether the temperature T1 at the inlet of the trap 4 is above a predetermined value (580° C.). If the answer to this question is "no", then the program proceeds to the point 732 where the calculated fuel-injection pulse-width is corrected by multiplying it by 1:1 so as to create a relatively rich air-fuel mixture in the mixture conduit 8. Following this, the program proceeds to a determination step at the point 740 which will be described later.

If the temperature T1 is above 580° C. at the point 728, then at the point 730, another determination is made as to whether the temperature T1 at the inlet side of the trap 4 is below a predetermined value (620° C.). If the answer to this question is "no", then the program proceeds to the point 734 where the computer corrects the calculated fuel-injection pulse-width by multiplying it by 0.9 so as to create a lean air-fuel mixture in the mixture conduit 8. Following this, the program proceeds to the point 740.

If the temperature T1 at the inlet side of the trap 4 is below 620° C. at the point 730; that is, if the temperature T1 is within the range of 580° C. to 620° C. including a target temperature (600° C.), then the program proceeds to the point 736 where the calculated fuel-injection pulse-width is outputted to the digital-to-analog converter 72 without any correction. Following this, the program proceeds to the point 740 where a determination is made as to whether the temperature T2 at the outlet side of the trap 4 is below a predetermined value (850° C.). If the answer to this question is "yes", then at the point 742, another determination is made as to whether the value of the regeneration timer which indicates the time period of the trap regeneration exceeds a predetermined value (10 minutes). If the answer to this question is "no", then the program returns to the point 742. Otherwise, the program proceeds to the point 746.

If the temperature T2 at the outlet side of the trap 4 is 850° C. or more at the point 740, then the program proceeds to the point 746 where the computer generates an "off" signal to the third switch circuit 69 which thereby opens the relay switch 16 to deenergize the fuel pump 12 and also to the gate circuit 71 which thereby disconnects the triangular pulse generator 70 from the comparator 73, thereby stopping the supply of fuel to the mixture conduit 8. After a delay (30 seconds) at the point 748, the program proceeds to the point 750 where the computer generates an "off" signal to the second switch circuit 68 which thereby returns to three-way valve 14 to the first position stopping the air supply to the mixture conduit 8 so as to terminate the trap regeneration. Following this, the program returns to the point 704.

If the temperature T1 at the inlet side of the trap 4 is 560° C. or less at the point 724, then the program proceeds to the point 752 where the computer generates an "on" signal to the first switch circuit 67 which thereby closes the relay switch 17 to actuate the glow plug 9. Following this, a determination is made at the point 754 as to whether the temperature T1 at the inlet side of the trap 4 is below a predetermined value (540° C.). If the answer to this question is "yes", then the program proceeds to the point 756 where the computer corrects the calculated fuel-injection pulse-width by multiplying it by 1.2 so as to create a rich air-fuel mixture in the mixture conduit 8. At the point 758, a determination is made as to whether the time period of the fuel control under the condition where the temperature T1 is 560° C. or less exceeds a predetermined time (15 seconds). If the answer to this question is "no", then the program returns to the point 724. Otherwise, the program proceeds to the point 760 where the computer generates an "off" signal to the first switch circuit 67 which thereby opens the relay switch 17 to deenergize the glow plug 9. Following this, the program proceeds to the point 746 where the computer generates an "off" signal to the third switch circuit 69 which thereby opens the relay siwtch 16 to deenergize the fuel pump 12 and also to the gate circuit 71 which thereby disconnects the triangular pulse generator 70 from the comparator 73, thereby stopping the supply of fuel to the mixture conduit 8.

If the temperature T1 at the inlet side of the trap 4 is 540° C. or less at the point 754, then the program proceeds to the point 762 where the computer corrects the calculated fuel-injection pulse-width by multiplying it by 1.3 so as to create a rich air-fuel mixture in the mixture conduit 8. Following this, the program proceeds to the previously described determination step at the point 758.

This embodiment can avoid an abnormal temperature rise of the trap causing failure of the trap particularly under engine idling conditions where the engine discharge a little amount of exhaust gases by placing the regenerative burner out of operation when the temperature at the outlet side of the trap exceeds a predetermined value.

Although the present invention has been described in connection with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. An apparatus for use in an internal combustion engine having an exhaust conduit for discharging exhaust particles together with exhaust gases to the atmosphere, and a trap located in said exhaust conduit for collecting exhaust particles, said apparatus comprising:
regenerative means operable to generate a quantity of heat to burn the exhaust particles collected in said trap so as to regenerate said trap;
sources for deriving signals indicative of (a) the pressure (P1) on the inlet side of said trap, (b) the pressure (P2) on the outlet side of said trap, (c) engine speed and (d) engine load; and
control means responsive to the signals indicative of (a) and (b) for detecting a regeneration requirement to operate said regenerative means so as to regenerate said trap for a predetermined time period, said control means including means responsive to the signals indicative of (c) and (d) for controlling the quantity of heat said regenerative means generates to maintain the inlet side of said trap at a target temperature during the regeneration period.

2. The apparatus of claim 1, wherein said means responsive to the signals indicative of (c) and (d) for controlling the quantity of heat said regenerative means generates includes:
means for controlling the quantity of heat said regenerative means generates; and
means for calculating a value corresponding to a setting of said means for controlling the quantity of heat said regenerative means generates, said calculation being performed as functions of engine speed and engine load.

3. The apparatus of claim 2, which further comprises a source for deriving a signal indicative of (e) the temperature (T1) on the inlet side of said trap, and wherein said control means includes means for modifying said calculated value based upon the value of the signal indicative of (e).

4. The apparatus of claim 3, which further comprises a source for deriving a signal indicative of (f) the temperature (T2) on the outlet side of said trap, and wherein said control means includes:
means responsive to the signal indicative of (f) for detecting the temperature (T2) exceeding a predetermined limit; and
means for placing said regenerative means out of operation when the temperature (T2) exceeds the predetermined limit.

5. The apparatus of claim 3, wherein said means for modifying said calculated value based upon the value of the signal indicative of (e) includes means responsive to the signal indicative of (e) for detecting the temperature (T1) being in a first temperature range having a lower and upper limit, in a second temperature range having a lower limit higher than the upper limit of the first temperature range, the second temperature range including said target temperature, or in a third temperature range having a lower limit higher than the upper limit of the second temperature range.

6. The apparatus of claim 5, wherein said means for modifying said calculated value based upon the value of the signal indicative of (e) includes means for multiplying said calculated value by a constant (A) greater than 1 so as to increase the quantity of heat said regenerative means generates when the temperature (T1) is in the first temperature range, and for multiplying said calculated value by a constant (B) smaller than 1 so as to decrease the quantity of heat said regenerative means generates when the temperature (T1) is in the third temperature range.

7. The apparatus of claim 6, which further comprises a source for deriving a signal indicative of (f) the temperature (T2) on the outlet side of said trap, and wherein said control means includes;
means responsive to the signal indicative of (f) for detecting the temperature (T2) exceeding a predetermined limit greater than the upper limit of the third temperature range; and
means for placing said regenerative means out of operation when the temperature (T2) exceeds the predetermined limit.

8. The apparatus of claim 1, wherein said regenerative means comprises a burner located in said exhaust conduit upstream of said trap, said burner being operable to burn an air-fuel mixture supplied thereto to generate a quantity of heat, said burner including means for increasing the temperature in said burner to a level sufficient to ignite the air-fuel mixture upon the occurrence of a regeneration requirement.

9. The apparatus of claim 8, wherein said means responsive to the signals indicative of (c) and (d) for controlling the quantity of heat said regenerative means generates includes:
means for controlling the quantity of fuel to said burner; and
means for calculating a value corresponding to a setting of said means for controlling the quantity of fuel to said burner, said calculation being performed as functions of engine speed and engine load.

10. The apparatus of claim 9, which further comprises a source for deriving a signal indicative of (e) the temperature (T1) on the inlet side of said trap, and wherein said control means includes means for modifying said calculated value based upon the value of the signal indicative of (e).

11. The apparatus of claim 10, which further comprises a source for deriving a signal indicative of (f) the temperature (T2) on the outlet side of said trap, and wherein said control means includes;
means responsive to the signal indicative of (f) for detecting the temperature (T2) exceeding a predetermined limit; and
means for stopping the supply of fuel to said burner when the temperature (T2) exceeds the predetermined limit.

12. The apparatus of claim 10, wherein said means for modifying said calculated value based upon the value of the signal indicative of (e) includes means responsive to the signal indicative of (e) for detecting the temperature (T1) being in a first temperature range having a lower and upper limit, in a second temperature range having a lower limit higher than the upper limit of the first temperature range, the second temperature range including said target temprature, or in a third temperature range having a lower limit higher than the upper limit of the second temperature range.

13. The apparatus of claim 12, wherein said means for modifying said calculated value based upon the value of the signal indicative of (e) includes means for multiplying said calculated value by a constant (A) greater than 1 so as to increase the quantity of fuel to said burner when the temperature (T1) is in the first temperature range, and for modifying said calculated value by a constant (B) smaller than 1 so as to decrease the quantity of fuel to said burner when the temperature (T1) is in the third temperature range.

14. The apparatus of claim 13, wherein said means for modifying said calculated value based upon the value of the signal indicative of (e) includes means responsive to the signal indicative of (e) for stopping the supply of fuel when the temperature (T1) is below the lower limit of the first temperature range at a predetermined time after the occurrence of the regeneration requirement.

15. The apparatus of claim 13, which further comprises a source for deriving a signal indicative of (f) the temperature (T2) on the outlet side of said trap, and wherein said control means includes:
means responsive to the signal indicative of (f) for detecting the temperature (T2) exceeding a predetermined limit greater than the upper limit of the third temperature range; and
means for stopping the supply of fuel to said burner when the temperature (T2) exceeds the predetermined limit.

16. The apparatus of claim 12, wherein said means for modifying said calculated value based upon the value of the signal indicative of (e) includes means for multiplying said calculated value by a constant to increase the quantity of fuel to said burner for a predetermined time period after the occurrence of the regeneration requirement.

17. A method of controlling the operation of a regenerative means to generate a quantity of heat to burn the exhaust particles collected in a trap located in the exhaust conduit of an internal combustion engine, comprising the steps of:
measuring the pressure (P1) on the inlet side of said trap, the pressure (P2) on the outlet side of said trap, the engine speed, and the engine load;
detecting a regeneration requirement based upon the measured pressures (P1) and (P2) to operate said regenerative means so as to regenerate said trap for a predetermined time period; and
controlling the quantity of heat said regenerative means generates based upon the measured engine speed and engine load to maintain the inlet side of said trap at a target temperature during the regeneration period.

18. The method of claim 17, wherein the step of controlling the quantity of heat said regenerative means generates based upon the measured engine speed and engine load uses means for controlling the quantity of heat said regenerative means generates and includes calculating a value corresponding to a setting of said means for controlling the quantity of heat said regenerative means generates, said calculation being performed as functions of engine speed and engine load.

19. The method of claim 18, which further includes the steps of:
measuring the temperature (T1) on the inlet side of said trap; and
modifying said calculated value based upon the measured temperature (T1).

20. The method of claim 19, wherein the step of modifying said calculated value based upon the measured temperature (T1) includes the steps of:
detecting the temperature (T1) being in a first temperature range having a lower and upper limit, in a second temperature range having a lower limit higher than the upper limit of the first temperature range, the second temperature range including said target temperature, or in a third temperature range having a lower limit higher than the upper limit of the second temperature range;
multiplying said calculated value by a constant (A) greater than 1 so as to increase the quantity of heat said regenerative means generates when the temperature (T1) is in the first temperature range, and
multiplying said calculated value by a constant (B) smaller than 1 so as to decrease the quantity of heat said regenerative means generates when the temperature (T1) is in the third temperature range.

21. The method of claim 20, which further includes the steps of:
measuring the temperature (T2) on the outlet side of said trap;
detecting the measured temperature (T2) exceeding a predetermined limit greater than the upper limit of the third temperature range; and
stopping the operation of said regenerative means when the measured temperature exceeds the predetermined limit.

22. The method of claim 19, which further includes the steps of:
measuring the temperature (T2) on the outlet side of said trap;
detecting the measured temperature (T2) exceeding a predetermined limit; and
stopping the operation of said regenerative means when the measured temperature exceeds the predetermined limit.

* * * * *